United States Patent Office 3,192,224
Patented June 29, 1965

3,192,224
AMINOMETHYL OXAZOLINES AND PROCESS OF PREPARING SAME
Charles Kapar, Brooklyn, N.Y., assignor to Coastal Interchemical Company, Brooklyn, N.Y.
No Drawing. Filed Mar. 11, 1963, Ser. No. 264,049
4 Claims. (Cl. 260—307)

This invention relates to novel 2-(alkylaminomethyl) oxazolines and methods for their production.

Oxazoline compounds containing a substituent in the 2 position of the oxazoline ring have been prepared by reaction methods wherein a β-hydroxyethyl amide or β-haloethyl amide is prepared and subsequently cyclized to the corresponding oxazoline. Although oxazoline derivatives are generally well known, their effectiveness in certain applications has frequently been limited by lack of adequate functionality under conditions of utilization. Oxazoline compounds endowed with greater versatility of application by way of additional sites of chemical or physical activity within the molecule are little known.

It has now been found that a tertiary alkylamino group, removed by only a methylene group from an oxazoline ring, enhances the reactivity of the oxazoline ring. However, preparation of 2-(alkylaminomethyl)oxazolines has not previously been contemplated in view of the adverse synthetic methods requiring use of precursor amino acids, or multiple steps to attach the amine to an oxazoline ring.

It is an object of this invention to provide novel oxazoline compounds.

It is another object of this invention to provide novel compounds having a reactive oxazoline ring and other functional groups within the compound.

It is still another object of this invention to provide a novel process for the production of 2-(alkylaminomethyl) oxazolines.

Other objects and advantages will become apparent hereinafter.

The objects of this invention are accomplished in general by providing compounds represented by the general formula

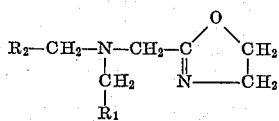

wherein $R_1$ is a radical selected from the group consisting of

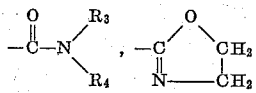

and —CN wherein $R_3$ is an aliphatic group containing 1 to 18 carbon atoms, and $R_4$ is selected from the group consisting of hydrogen and aliphatic radicals containing 1 to 18 carbon atoms, and where $R_2$ is a member selected from the group consisting of —$CH_2$, NH, and $R_1$. Compounds of this invention may be prepared by the novel process comprising reacting ethylene oxide in an anhydrous medium with nitrilotriaceto nitrile having the formula:

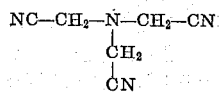

The novel 2-(alkylaminomethyl)oxazolines of this invention are in general non-crystalline materials and are water soluble unless containing alkyl groups of more than 12 carbon atoms; in which case the compound generally forms micellar colloidal dispersions in water. The compositions as a class exhibit sufficient cationic nature to become attracted to negatively charged materials such as cellulose. However the extent of cationic activity of the compositions is sufficiently mild to permit their compatibility in anionic systems such as solutions of anionic detergents ordinarily coagulated by cationic materials, and anionic formaldehyde condensation prepolymers. At elevated temperatures, and preferably in the presence of acidic catalysts, the oxazoline compounds of this invention undergo useful chemical transformations such as: formation of polymeric materials; cross-linking of other polymer systems; and chemical attachment to negatively charged surfaces onto which they had been absorbed.

In addition to an oxazoline ring and tertiary alkyl amine group, the compounds of this invention possess further sites of functionality represented by the groups $R_1$ and $R_2$ in the generic structural formula. These groups contribute further to the scope of usefulness of the compounds of this invention, and in this respect the 2-(alkylaminomethyl)oxazoline grouping may be regarded as a versatile carrier for the third functional moiety. The physical and chemical characteristics of the third functional moiety are generally unchanged from their ordinarily expected properties. For example, the cyano group affords opportunity for further chemical conversions such hydrolysis to carboxylic acids, conversion to amidoximes with hydroxylamine, formation of amidines with amines, formation of triazine rings by addition of dicyandiamide, conversion to imidazolines by reaction with ethylene diamine, and other known chemical conversions. The N-alkyl amido moiety, when mono-substituted, can undergo conventional substitution reactions which replace the single amidic hydrogen atom with halogen, nitroso, or methylol groups. Likewise, primary amino groups which may be present in the compounds of this invention will possess the generally expected chemical and catalytic properties of primary aliphatic amines. Alkyl groups which are straight chain aliphatic hydrocarbons having greater than 12 carbon atoms function as a lipophilic entity and impart surface activity to the compounds of this invention. When the alkyl group is a hydrophillic aliphatic species such as methylol, hydroxyethyl, poly(oxyethylene), carbohydrate radicals, and the like, the compounds become useful as compatible modifying agents for water-soluble resins. It may be noted that all the compounds of this invention have at least two basic nitrogen atoms, namely the oxazoline nitrogen, and the tertiary amino nitrogen.

In the reaction process of this invention, ethylene oxide and nitrilotriaceto nitrile are caused to interact in a medium devoid of active hydrogen atoms as determined by the Zerewitinoff test (described by Kohler in J. Am. Chem. Soc., 49, 3181 (1927). The reaction is preferably carried out in an autoclave equipped with means for range of about 40° to 150° C. are found preferable. In operation the ethylene oxide may be added as a cooled liquid to the autoclave containing a predetermined weight of nitrilotriaceto nitrile and the autoclave then sealed and heated. Alternatively, the ethylene oxide may be led into the autoclave continuously during the reaction until the desired amount has been added. One mole of ethylene oxide is found to react with one mole of nitrile group in forming the oxazoline structure. The product yields are generally between 40% and 90% based upon the nitrilotriacetonitrile. Highest yields are obtained in the production of the symmetrical compound, tris(oxazolinomethyl)amine which is preferably produced by employing a large molar excess of ethylene oxide. Lesser yields are obtained in the production of the doubly reacted product, bis(oxazolinomethyl)cyanomethyl amine, since some of the mono and trisubstituted products are also formed and must be removed from the reaction mixture. The singly reacted species, bis(cyanomethyl)oxazolinomethyl amine, is preferably produced by employing a large molar excess of nitrilotriaceto nitrile which, in view of its insolubility in water, is easily separated from the water-soluble oxazoline reaction product. Inert solvents devoid of active hydrogen may be employed in carrying out the reaction, especially in the preparation of the monosubstituted product; preferred solvents being dioxane and dimethylformamide. Traces of basic reaction catalysts such as sodium methoxide and potassium hydroxide are frequently useful in enhancing the speed of reaction. Although the mechanism and explanation of the reaction is not clear, it is fairly possible that a molecule of ethylene oxide merely adds to the nitrile group to form an oxazoline ring. It is surprising that the reaction occurs, since ordinary organic nitriles do not exhibit this reaction, and closely analogous nitriles such as N-methyl iminodiacetonitrile:

have been found in the course of these studies to provide poor yields of oxazoline ring formation. Likewise, other epoxides such as propylene oxide have herein been found to exhibit considerably less reactivity with nitrilotriacetonitrile than ethylene oxide.

The reaction products, after removal of solvent or excess ethylene oxide by evaporation, may be purified by methods such as fractional precipitation from solvent non-solvent mixtures, elution column chromatography, and re-crystallization of the amine salt derivatives. Product analysis and identification may be carried out by elemental analysis, molecular weight determination, infrared spectrophotometric analysis, chemical titrations, nuclear magnetic resonance spectra and other conventional methods.

The novel compositions of this invention may be produced by alternative methods. For example, the action of ethanolamine and water on nitrilotriacetic nitrile at temperatures of 80 to 100° C. will also convert the nitrile groups to oxazoline rings. Likewise, methods such as those generally taught by the prior art (cf. Chem. Reviews, 44, p. 449 (1949)), are applicable, although with generally lower yields.

Compositions of this invention containing nitrile groups, as produced in the herein described reaction of nitrilotriaceto nitrile with less than three moles of ethylene oxide, may be further modified by known chemical transformations which may be carried out on the nitrile groups. Such nitrile-containing compounds are found especially amenable to reaction with aqueous aliphatic primary and secondary amines according to the method of Exner et al., J. Am. Chem. Soc., 77, 1103, and 3251 (1955), to form N-alkyl amides. The alkyl substituents of said N-alkyl amides are derived from the amine employed in the amide-forming reaction; by which method primary amines yield monosubstituted amides, and secondary amines yield di-substituted amides. In a special embodiment of this invention, it has been found that when only one nitrile group is present in the 2-(alkylaminomethyl)oxazoline, said nitrile group can be hydrogenated to the corresponding primary amine group. This differs unexpectedly from 2-(alkyl aminomethyl)oxazoline containing two nitrile groups, and nitrilotriaceto nitrile itself, which upon hydrogenation yield only non-resolvable tars.

The following examples are given to further illustrate the present invention, it being understood however, that the specific embodiments set forth in the hereinafter examples are intended as illustrations for a fuller understanding of the invention and that no undue limitations are to be imposed by reason thereof.

EXAMPLE I

*Preparation of bis(cyanomethyl)oxazolinomethyl amine*

The following ingredients were charged to a two liter stainless steel autoclave: 268 grams (2.0 moles) of dry nitrilotriaceto nitrile, 900 cc. purified dry dioxane, 44 grams (1.0 mole) of liquid ethylene oxide at 5° C., and 0.2 gram of sodium methoxide adsorbed on a Raney nickel carrier washed with dioxane. The autoclave was then sealed, heated to 105° C., and agitated for 14 hours. The autoclave was then cooled, and the contents removed. The reaction product mixture was submitted to vacuum evaporation to remove the dioxane. The residual product was extracted with distilled water at a temperature of 75° C. to separate the oxazoline product from unreacted nitrilotriaceto nitrile. A residue of 142 grams of nitrilotriaceto nitrile was thereby obtained. The aqueous extract was submitted to vacuum evaporation to recover the solute. The recovered solute was then extracted with 100 cc. of water at 2° C. to remove the more soluble bis and tris-oxazoline by-product compounds present in small amounts. The residual, dried product is an amorphous glassy solid weighing 139 grams, and thereby representing an 82% yield based upon the non-recovered nitrilotriaceto nitrile. The product is light yellow in color, and is soluble in water, dioxane, and dimethylformamide analysis. Calculated for ($C_8H_{10}N_4O$): M.W. 178; C, 53.9; H, 5.6; N, 31.5; O, 9.0. Found: M.W. 173; C, 55.4; H, 6.1; N, 31.2; O, 8.4.

To a resin flask were charged 17.8 parts (0.1 mole) of the bis(cyanomethyl)oxazolinomethyl amine prepared above, 11.6 parts (0.1 mole) of hexamethylene diamine, and 100 parts water. The homogeneous solution which formed was heated with continuous agitation at 85° C., employing a reflux condenser to prevent loss of water. After two hours' time, the mixture began to thicken, and the water was then allowed to slowly evaporate during continued heating and agitation. A resinous polymeric material was thus obtained which could be drawn into filaments from the melt, and could be cast into strong films from solution in glacial acetic acid or formic acid. The formation of the polymer product in this manner illustrates the reactivity and utility of the specific compound of this invention, bis(cyanomethyl)oxazolinomethyl amine.

EXAMPLE II

*Preparation of bis(oxazolinomethyl)cyanomethyl amine*

The following ingredients were charged to a two liter stainless steel autoclave: 175 grams (1.0 mole) of the bis(cyanomethyl)oxazolinomethyl amine product of Example I, 900 cc. purified dry dioxane, and 44 grams (1.0 mole) of liquid ethylene oxide at 5° C. The autoclave was then sealed, heated to 95° C., and agitated for 17 hours. The autoclave was then cooled, and the contents removed. Petroleum ether was added to the dioxane solution to the point of incipient precipitation of solute. This solution was then introduced to the top of a chromatographic elution column packed with activated alumina adsorbent. Following adsorption, the product was eluted with pure dioxane. Fractions were collected and solvent was evaporated from each fraction. The product was obtained as a major middle fraction comprising about 68% of the total eluted material. The product is an amorphous glassy solid which becomes tacky at about 35° C. *Analysis.*—Calculated for ($C_{10}H_{14}N_4O_2$): M.W. 222; C, 54.0; H, 6.3; N, 25.2; O, 14.4. Found: M.W. 229; C, 59.3; H, 7.2; N, 24.3; O, 14.1.

EXAMPLE III

*Preparation of tris(oxazolinomethyl)amine*

The following ingredients were charged to a two liter stainless steel autoclave: 135 grams (1.0 mole) dry nitrilotriaceto nitrile, 440 grams (10.0 moles) liquid ethylene oxide at 5° C., and 0.2 gram of sodium methoxide adsorbed on a Raney nickel carrier washed with dioxane. The autoclave was then sealed, heated to 97° C., and agitated for 19 hours. The autoclave was then cooled, and the contents removed. The excess ethylene oxide was allowed to evaporate. The product obtained is a viscous, non-distillable oil. Infra-red analysis confirms the complete absence of nitrile groups. The product is soluble in water, dioxane, dimethylformamide and most ordinary polar organic solvents. *Analysis.*—Calculated for ($C_{12}H_{18}N_4O_3$): M.W. 266; C, 55.4; H, 6.9; N, 21.5; O, 18.4. Found: M.W. 249; C, 53.6; H, 7.2; N, 24.2; O, 19.7.

The utility of the tris(oxazolinomethyl)amine as a cross-linking agent was demonstrated in the following manner:

6.0 parts of tris(oxazolinomethyl)amine, 113 parts of e-caprolactam, and 0.5 part phosphoric acid catalyst were charged to a resin kettle and heated to 260° with agitation under a blanket of nitrogen. The mixture was poured into a mold and maintained at 255° C. under nitrogen for 12 hours. Upon cooling, a hard, resinous product was obtained having a melting point of about 290° C. By way of comparison, a polymer of e-caprolactam prepared in similar fashion but without the oxazoline co-reactant, has a melting point of only 215° C.; and is soluble in dimethylformamide which only swells the above-described higher melting product. The tris(oxazolinomethyl)amine is also a useful additive for polycaproamide prepared with basic or neutral catalysts.

EXAMPLE IV

*Preparation of bis(N-stearylamidomethyl)oxazolinomethyl amine*

One hundred and seventy-eight grams (1.0 mole) of bis(cyanomethyl)oxazolinomethyl amine (prepared in Example I), 624 grams (2.2 moles) of distilled monostearyl amine, 300 cc. of water, and 300 cc. of xylene were charged to a three liter, 3 neck flask equipped with thermometer, reflux condenser, stirring device, and external heating mantle. The mixture was heated under reflux conditions with continuous agitation for 9 hours, during which time ammonia evolves from the reaction mixture and escapes through the condenser. The reaction mixture is extracted with three 150 cc. portions of xylene, and two 150 cc. portions of water at 2° C. The dried product, a waxy semi-solid, is obtained in 72% yield based upon the oxazoline starting material. The product forms opaque colloidal dispersions in water in concentrations of up to about 15%. Aqueous dispersions of the product are compatible with detergent solutions and, at a 0.3% concentration, effectively soften cellulosic fabrics during ordinary laundering cycles.

EXAMPLE V

*Preparation of bis(oxazolinomethyl)-β-aminoethyl amine*

Into a one liter hydrogenation autoclave were charged 22.2 grams (0.1 mole) of bis(oxazolinomethyl)cyanomethyl amine (prepared in Example 2), 300 cc. of ethanol, and 6.0 grams of Raney nickel catalyst washed with ethanol. The autoclave was sealed, heated to 65° C. and agitated under a hydrogen pressure of 60 p.s.i.g. Within 15 hours the hydrogen uptake was 0.188 mole or 95% of theoretical for the hydrogenation of 0.1 mole of nitrile groups to primary amine. The reaction mixture was then removed from the autoclave, filtered to remove catalyst, and subjected to vacuum evaporation to remove the ethanol solvent. The residue, a dark yellow oil, was then dissolved in distilled water to a concentration of 10%. This solution was then adsorbed into an ion exchange column packed with Dowex 50, an acidic ion exchange resin. The adsorbed product was eluted with distilled water, and fractions were collected. The product was collected as a middle fraction representing about 65% of the eluted material. The product, a non-distillable oil, exhibits characteristic reactions of a primary amine compound. The molecular weight, determined by acid-base titration is 234, which compares favorably with the value of 226 calculated for the formula ($C_{10}H_{18}N_4O_2$).

By way of comparison, compounds such as nitrilotriaceto nitrile and bis(cyanomethyl)oxazolinomethyl amine, having two or more cyanomethyl groups, yield only non-resolvable tars by the hydrogenation process of this example.

EXAMPLE VI

*Preparation of bis(oxazolinomethyl)-N,N-bis(2-ethylhexyl)amido methyl amine*

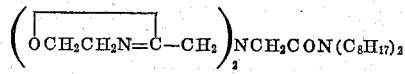

One hundred and thirty-four grams (1.0 mole) of nitrilotriaceto nitrile, 122 grams (2.0 mole) of monoethanolamine, 241 grams (1.0 mole) of di-2-ethylhexyl amine, and 300 cc. distilled water were charged to a two liter, 3 neck flask equipped with thermometer, reflux condenser, stirring device, and external heating mantle. The system was refluxed for 15 hours, during which time approximately 3.0 moles of ammonia were evolved, escaping through the condenser. The water in the mixture was then allowed to evaporate over a 5 hour period by warming the condenser to about 30° C. About 150 grams of activated alumina were then added to the flask to complete the dehydration. The product thus obtained, a heavy paste, was extracted with two 200 cc. portions of benzene, and then two 200 cc. portions of water at 2° C. The purified dried product weighs 318 grams.

Small amounts (e.g. 3–9%) of the oxazoline compound of this example, when incorporated into aqueous latices of vinyl addition polymers such as poly vinyl acetate, and acrylic polymers, are found to improve the film-forming properties of the polymer. When used in amounts of 10–20%, the oxazoline compound of this example improves the compatibility of mixtures of hydrophilic and hydropholic polymers such as mixtures of polyvinylacetate with coumarone-indene polymer. When applied as a finish coating to polycaproamide yarn in amounts of 0.05 to 0.2% based on the yarn, the oxazoline compound improves the adhesion of the yarn toward rubber in products such as reinforced tires and conveyor belts. Under anhydrous conditions, the oxazoline compound of this example forms a hard, insoluble polymer when heated at 200° C. in the presence of catalytic amounts of aluminum chloride.

As many widely different embodiments may be employed or made without departing from the spirit and scope of this invention, it is to be understood that the invention is to be in no wise restricted save as set forth in the appended claims.

I claim:

1. A compound of the formula

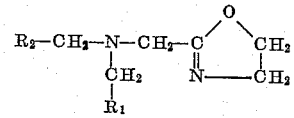

wherein $R_1$ is a radical selected from the group consisting of

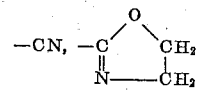

and

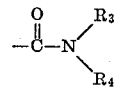

wherein $R_3$ and $R_4$ are selected from the group consisting of hydrogen, saturated aliphatic hydrocarbon of 1 to 18 carbon atoms, hydroxymethyl, hydroxyethyl, and poly(oxyethylene) of less than 18 carbon atoms, and $R_2$ is selected from the group consisting of $R_1$ and —$CH_2NH_2$.

2. The compound of claim 1, derivable from nitrilotriacetonitrile wherein $R_1$ is

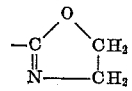

and $R_2$ is —CN.

3. The compound of claim 1 wherein both $R_2$ and $R_1$ are

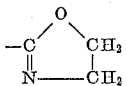

4. A process for the production of 2-oxazolines comprising reacting nitrilotriaceto nitrile with ethylene oxide at a temperature in the range of from about 0° C. to about 150° C.

References Cited by the Examiner
UNITED STATES PATENTS
2,579,478  12/56  Djerassi et al. _____ 260—307.6

IRVING MARCUS, *Primary Examiner.*
NICHOLAS S. RIZZO, WALTER A. MODANCE,
*Examiners.*